(12) United States Patent
Otsuka (10) Patent No.: US 9,891,503 B2
(45) Date of Patent: Feb. 13, 2018

(54) LIGHT EMITTING DEVICE INCLUDING FIRST AND SECOND POWER SOURCES, METHOD OF CONTROLLING THE SAME, IMAGE PICKUP APPARATUS, AND STORAGE MEDIUM

(71) Applicant: CANON KABUSHIKI KAISHA, Tokyo (JP)

(72) Inventor: Genta Otsuka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/619,341

(22) Filed: Feb. 11, 2015

(65) Prior Publication Data
US 2015/0227027 A1 Aug. 13, 2015

(30) Foreign Application Priority Data
Feb. 13, 2014 (JP) .................................. 2014-025516

(51) Int. Cl.
*G03B 15/05* (2006.01)
*H04N 5/225* (2006.01)
(Continued)

(52) U.S. Cl.
CPC ........... *G03B 15/05* (2013.01); *H04N 5/2256* (2013.01); *H04N 5/2354* (2013.01);
(Continued)

(58) Field of Classification Search
CPC .. G03B 15/05; H04N 5/2256; H04N 5/23241; H04N 5/23245; H04N 5/2354
(Continued)

(56) References Cited

U.S. PATENT DOCUMENTS

| 5,003,229 | A | * | 3/1991 | Ogawa | H05B 41/32 315/240 |
| 5,934,790 | A | * | 8/1999 | Quintana | A45C 15/06 362/156 |

(Continued)

FOREIGN PATENT DOCUMENTS

| CN | 1243415 A | 2/2000 |
| CN | 1498013 A | 5/2004 |

(Continued)

OTHER PUBLICATIONS

Office Action issued in Chinese Appln. No. 201510080076.4 dated Mar. 2, 2017. English translation provided.

*Primary Examiner* — Antoinette Spinks
(74) *Attorney, Agent, or Firm* — Rossi, Kimms & McDowell LLP (57) ABSTRACT

A light emitting device including first and second power sources, which is capable of emitting light without being affected by a charging recycle period. The light emitting device includes an LED as a light emitting section for emitting light, and illuminates an object by light emission from the LED. The light emitting device further includes a first power source and a second power source that is charged by the first power source. Light emission from the LED is controlled using one of the first power source and the second power source as an input power supply according to light emitting current for causing the LED to emit light.

18 Claims, 8 Drawing Sheets

(51) Int. Cl.
*H04N 5/232* (2006.01)
*H05B 33/08* (2006.01)
*H04N 5/235* (2006.01)

(52) U.S. Cl.
CPC ..... *H04N 5/23241* (2013.01); *H04N 5/23245* (2013.01); *H05B 33/0815* (2013.01)

(58) Field of Classification Search
USPC ........................................................ 348/371
See application file for complete search history.

(56) References Cited

U.S. PATENT DOCUMENTS

| | | |
|---|---|---|
| 6,147,460 A | 11/2000 | Ichihara |
| 6,516,144 B2 | 2/2003 | Imamura et al. |
| 6,804,461 B1 | 10/2004 | Hagiuda et al. |
| 8,017,528 B2 * | 9/2011 | Yoneda ............. H01L 21/26513 257/E21.471 |
| 8,866,392 B2 * | 10/2014 | Chen ...................... G08B 15/00 315/152 |
| 2012/0106123 A1 * | 5/2012 | Treurniet ................ F21S 6/004 362/20 |

FOREIGN PATENT DOCUMENTS

| | | |
|---|---|---|
| CN | 201637979 U | 11/2010 |
| EP | 1380882 A2 | 1/2004 |
| JP | H0675270 A | 3/1994 |
| JP | 2000231143 A | 8/2000 |
| JP | 2000250103 A | 9/2000 |
| JP | 2004109414 A | 4/2004 |
| JP | 2010004692 A * | 1/2010 |
| JP | 2013243257 A | 12/2013 |

* cited by examiner

LIGHT EMITTING DEVICE INCLUDING FIRST AND SECOND POWER SOURCES, METHOD OF CONTROLLING THE SAME, IMAGE PICKUP APPARATUS, AND STORAGE MEDIUM

BACKGROUND OF THE INVENTION

Field of the Invention

The present invention relates to a light emitting device including first and second power sources, a method of controlling the same, an image pickup apparatus, and a storage medium, and more particularly to a method for emitting light without being affected by a charging recycle period or the like.

Description of the Related Art

In recent years, among image pickup apparatuses, such as a digital still camera and a mobile phone with a camera function, with increase in luminance of a light emitting element, such as an LED, an increasing number of them use an LED for a light emitting device (hereinafter also referred to as "the strobe" or "the flash").

In a flash circuit using an LED, a high-voltage circuit is not required, differently from a flash circuit using a light emitting tube, such as a Xenon tube. Therefore, for the flash circuit using an LED, it is possible to configure an LED drive circuit as a circuit relatively compact in size.

Further, the LED is higher in light emission efficiency than the Xenon tube, and is capable of reducing electric power consumed for obtaining the same amount of light emission by increasing the efficiency of the drive circuit.

However, when performing strobe photographing (flash photographing) of a still image with the flash using an LED (hereinafter referred to as "the LED flash"), although the LED is high in light emission efficiency, it is necessary to cause a large amount of current to instantaneously flow through the LED.

To drive the LED, there has been proposed, for example, a flash unit which is provided with a capacitor having a large capacity, such as an electric double-layer capacitor, as an auxiliary power supply of a battery for the LED flash (LED strobe) (see Japanese Laid-Open Patent Publication No. 2010-4692).

In this flash unit, the electric double-layer capacitor as the auxiliary power source is charged and is used as an input power supply for the LED, whereby a large current is caused to instantaneously flow through the LED to drive the same.

By the way, in an LED drive circuit described in Japanese Laid-Open Patent Publication No. 2010-4692, a recycle time occurs when charging the electric double-layer capacitor from a battery. During this recycle time, the user cannot perform strobe photographing. For example, unless the charging voltage of the electric double-layer capacitor exceeds at least the anode electric potential of the LED, it is impossible to cause the LED to emit light.

Further, when considering so-called full light emission from the LED, it is impossible to perform full light emission from the LED during a charging time period for charging the LED to a charging voltage required to perform full light emission, which is higher than the anode electric potential of the LED.

As described above, in the LED drive circuit described in Japanese Laid-Open Patent Publication No. 2010-4692, the user cannot perform strobe photographing during the charging time period for charging the electric double-layer capacitor, which sometimes prevents the user from immediately performing strobe photographing even when the user desires to perform strobe photographing.

SUMMARY OF THE INVENTION

The present invention provides a light emitting device including first and second power sources, which is capable of emitting light without being affected by a charging recycle period, a method of controlling the same, an image pickup apparatus, and a storage medium.

In a first aspect of the present invention, there is provided a light emitting device that includes a light emitting section for emitting light, and illuminates an object by the light emitting section, comprising a first power source, a second power source configured to be charged by the first power source, and a light emission control unit configured to perform light emission control of the light emitting section, using one of the first power source and the second power source as an input power supply according to light emitting current for causing the light emitting section to emit light.

In a second aspect of the present invention, there is provided a light emitting device that includes a light emitting section for emitting light, and illuminates an object by the light emitting section, comprising a first power source, a second power source configured to be charged by the first power source, and a light emission control unit configured to perform light emission control of the light emitting section, using one of the first power source and the second power source as an input power supply according to a charging voltage level of the second power source.

In a third aspect of the present invention, there is provided an image pickup apparatus comprising an image pickup unit configured to obtain an image by picking up an image of an object, a light emitting device that includes a light emitting section for emitting light, and illuminates an object by the light emitting section, the light emitting device including a first power source, a second power source configured to be charged by the first power source, and a light emission control unit configured to perform light emission control of the light emitting section, using one of the first power source and the second power source as an input power supply according to light emitting current for causing the light emitting section to emit light, and an image processing unit configured to perform predetermined image processing on the image obtained by the image pickup unit to thereby obtain image data.

In a fourth aspect of the present invention, there is provided an image pickup apparatus comprising an image pickup unit configured to obtain an image by picking up an image of an object, a light emitting device that includes a light emitting section for emitting light, and illuminates an object by the light emitting section, the light emitting device including a first power source, a second power source configured to be charged by the first power source, and a light emission control unit configured to perform light emission control of the light emitting section, using one of the first power source and the second power source as an input power supply according to a charging voltage level of the second power source, and an image processing unit configured to perform predetermined image processing on the image obtained by the image pickup unit to thereby obtain image data.

In a fifth aspect of the present invention, there is provided a method of controlling a light emitting device that includes a light emitting section for emitting light, a first power source, and a second power source configured to be charged by the first power source, and illuminates an object by the light emitting section, comprising determining light emitting current for causing the light emitting section to emit light, and performing light emission control of the light emitting section, using one of the first power source and the second power source as an input power supply according to the determined light emitting current.

In a sixth aspect of the present invention, there is provided a method of controlling a light emitting device that includes a light emitting section for emitting light, a first power source, and a second power source configured to be charged by the first power source, and illuminates an object by the light emitting section, comprising detecting a charging voltage level of the second power source, and performing light emission control of the light emitting section, using one of the first power source and the second power source as an input power supply according to the detected charging voltage level of the second power source.

In a seventh aspect of the present invention, there is provided a non-transitory computer-readable storage medium storing a computer-executable control program for causing a computer to execute a method of controlling a light emitting device that includes a light emitting section for emitting light, a first power source, and a second power source configured to be charged by the first power source, and illuminates an object by the light emitting section, wherein the method comprises determining light emitting current for causing the light emitting section to emit light, and performing light emission control of the light emitting section, using one of the first power source and the second power source as an input power supply according to the determined light emitting current.

In an eighth aspect of the present invention, there is provided a non-transitory computer-readable storage medium storing a computer-executable control program for causing a computer to execute a method of controlling a light emitting device that includes a light emitting section for emitting light, a first power source, and a second power source configured to be charged by the first power source, and illuminates an object by the light emitting section, wherein the method comprises detecting a charging voltage level of the second power source, and performing light emission control of the light emitting section, using one of the first power source and the second power source as an input power supply according to the detected charging voltage level of the second power source.

According to the present invention, the light emission from the light emitting section is controlled by setting one of the first power source and the second power source as the input power supply according to the light emitting current to be supplied when causing the light emitting section to emit light, and hence the user can perform light emission at a desired timing. As a consequence, the user can perform photographing using light emitted from the light emitting section (i.e. strobe photographing) without concern for the charging recycle period.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
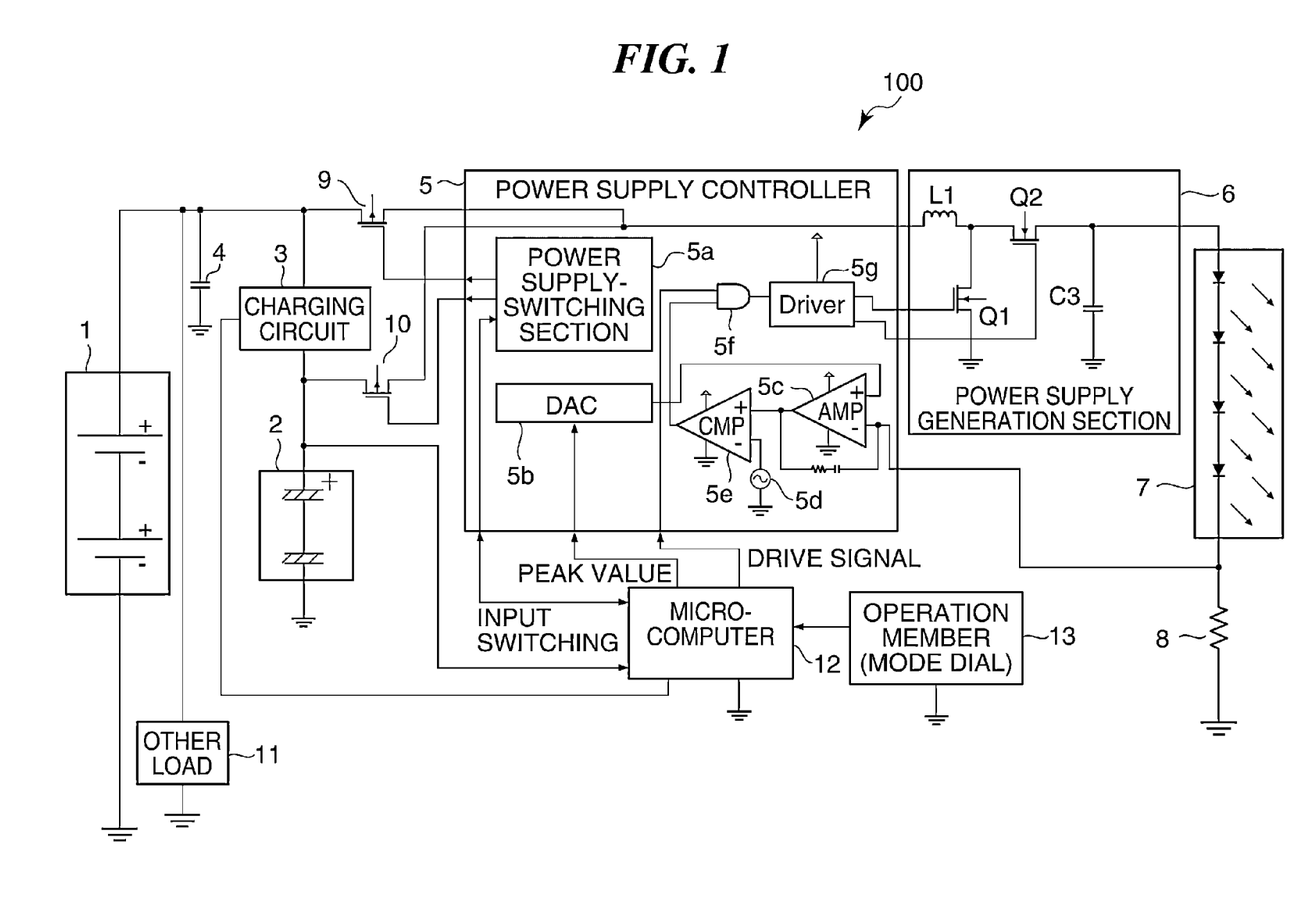
FIG. 1 is a circuit diagram of part of a camera as an image pickup apparatus according to a first embodiment of the present invention.

FIG. 1 is a circuit diagram of part of an image pickup apparatus according to a first embodiment of the present invention.

The image pickup apparatus shown in FIG. 1 is e.g. a digital camera (hereinafter simply referred to as "the camera"), and includes a light emitting device 100. The light emitting device 100 uses an LED 7 as a light emitting element which is a light emitting section. When an object is photographed, the light emitting device 100 irradiates the object with light to illuminate the object.

Note that the camera is capable of performing still image photographing and moving image photographing. Hereinafter, this light emitting device is referred to as "the LED light emitting device".

The LED light emitting device includes a first power source 1, and in the illustrated example, a two-cell lithium ion secondary battery (having a voltage of approximately 6.0 to 8.5 V) is used as the first power source 1. A second power source 2 is arranged in parallel with the first power source 1, and is charged by a charging circuit 3 using the first power source 1 as an input power supply.

In this example, a capacitor which is relatively low in internal impedance, such as an electric double-layer capacitor, is used as the second power source 2.

Since the second power source 2 is low in impedance, even when the light emitting current for causing the LED to emit light is increased, it is possible to reduce a voltage drop caused by the internal impedance.

An input capacitor 4 is arranged in parallel with the first power source 1, and a power supply controller 5 is connected to the first and second power sources 1 and 2 by switching (SW) circuits 9 and 10, respectively.

The power supply controller 5 implemented e.g. by a control IC selects one of the first power source 1 and the second power source 2 as an input power supply by controlling the SW circuits 9 and 10 to thereby control a power supply generation section 6. With this control, the LED 7 is driven with predetermined current by the power supply generation section 6.

In the illustrated example, the LED 7 is a four-light serial circuit, and when the LED 7 is driven at 2A, an anode-cathode voltage required to drive the LED 7 is obtained in the following manner: Assuming that a forward voltage (Vf) per one element of the LED applied when the LED is driven at 2A is approximately 3.0 to 4.0 V, the anode-cathode voltage required to light the LED is approximately 12 to 16 V.

A current sense resistor 8 is connected to the LED 7 in series, and performs I-V (current-voltage) conversion for converting the drive current of the LED 7 to a voltage to thereby feed back the voltage (feedback voltage) to the power supply controller 5. For example, assuming that a resistance value of the current sense resistor 8 is 10 mΩ, when the LED 7 is driven at 2A, a voltage drop is 0.2 V. That is, for the power supply controller 5 to drivingly control the power supply generation section 6 to drive the LED 7 at 2A, it is required to apply a voltage in a range of 0.2 V+12 to 16 V=12.2 to 16.2 V to the anode end of the LED 7.

The power supply generation section 6 is e.g. a boost circuit, and includes an inductor L1, an N-ch (N-channel) transistor Q1, a P-ch (P-channel) transistor Q2, and an output capacitor C3, which are necessary for the boost circuit.

The power supply controller 5 controls gates (Gate) of the N-ch transistor Q1 and the P-ch transistor Q2 based on the voltage fed back from the current sense resistor 8 e.g. by PWM control. With this, the power supply controller 5 performs power supply control such that predetermined current flows from the first power source 1 or the second power source 2 through the LED 7.

The power supply controller 5 performs the above-mentioned switching of power supply between the first power source 1 and the second power source 2 under the control of a control microcomputer (hereinafter simply referred to as the microcomputer) 12. As shown in FIG. 1, the power supply controller 5 includes a power supply-switching section 5a, a digital-to-analog converter (DAC) 5b, an error amplifier (AMP) 5c, a triangular wave generator 5d, a comparator section (CMP) 5e, an AND gate 5f, and a driver section (Driver) 5g.

The power supply-switching section 5a performs on-off control of the SW circuits 9 and 10 to thereby switch power supply between the first power source 1 and the second power source 2 under the control of the microcomputer 12.

The DAC 5b determines a current peak value for the LED 7 under the control of the microcomputer 12. The error amplifier 5c amplifies a feedback voltage fed back from the current sense resistor 8 by a predetermined gain with reference to an output (voltage) from the DAC 5b.

The comparator section 5e compares an output from the triangular wave generator 5d and an output from the error amplifier 5c to thereby output a duty ratio pulse for PWM control (i.e. PWM pulse).

The AND gate 5f is on-off controlled according to a drive signal output from the microcomputer 12, and outputs a PWM pulse to the driver section 5g when the drive signal is on, whereby the driver section 5g drives the N-ch transistor Q1 and the P-ch transistor Q2 according to the PWM pulse.

As shown in FIG. 1, an operation member (mode dial) 13 is connected to the microcomputer 12, and the microcomputer 12 and the operation member 13 are provided e.g. in the camera.

The microcomputer 12 sends the current peak value for the LED 7 to the DAC 5b of the power supply controller 5 and an input switching signal for switching the first power source 1 and the second power source 2 to the power supply-switching section 5a of the same, according to an operation mode (e.g. a moving image mode or a still image mode) set by the user operating the operation member 13.

Further, the microcomputer 12 outputs the aforementioned drive signal for on-off control of light emission to the AND gate 5f of the power supply controller 5 according to a timing at which the user operates the operation member 13.

Other load 11 represents load circuits other than the LED light emitting device, and electric power is supplied from the first power source 1 to the other load 11. The microcomputer 12 and the like correspond to the other load 11.

Figure 2:
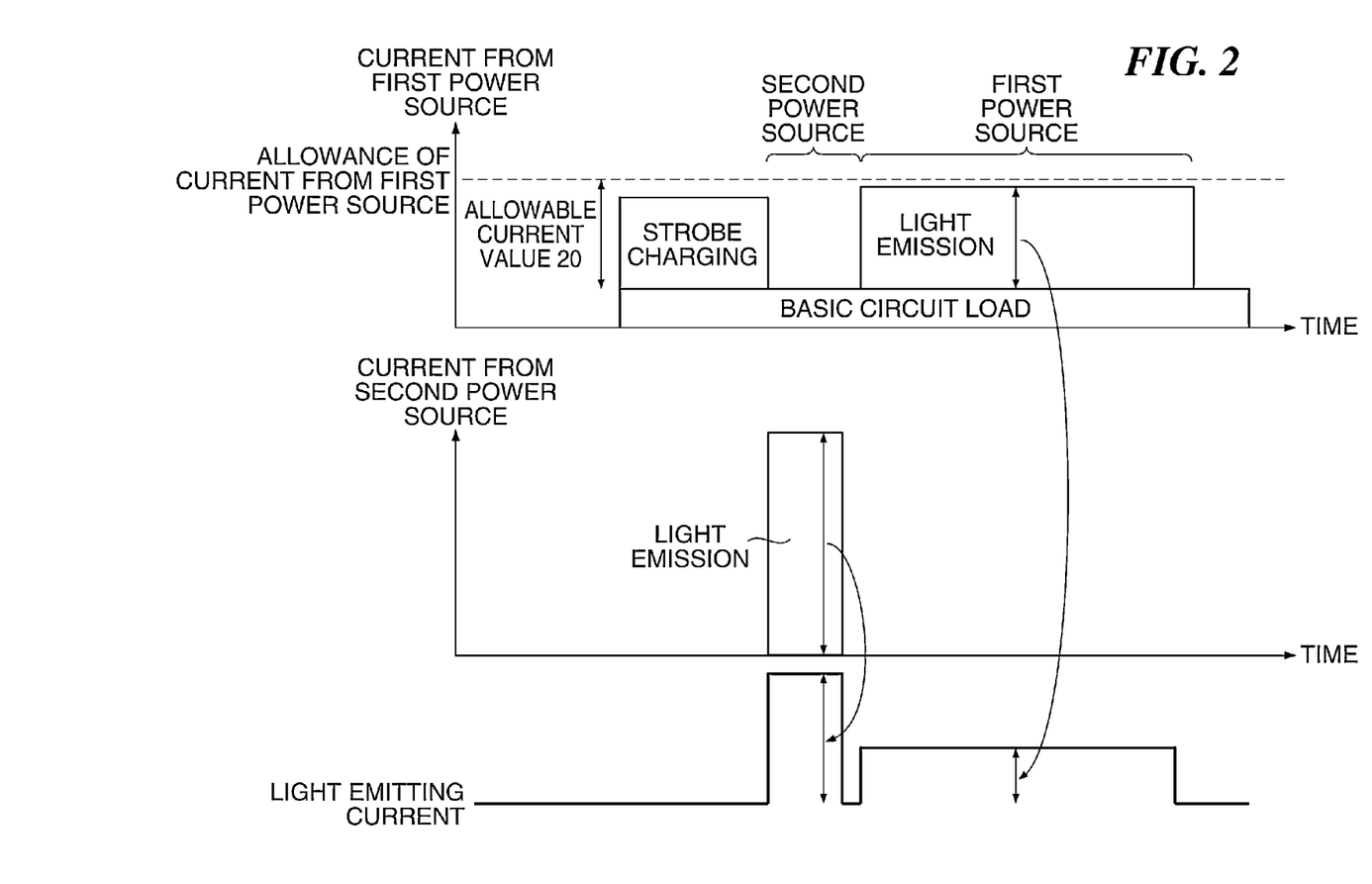
FIG. 2 is a timing diagram useful in explaining the operation of an LED light emitting device shown in FIG. 1.

FIG. 2 is a timing diagram useful in explaining the operation of the LED light emitting device appearing in FIG. 1.

FIG. 2 shows light emission performed using current from the first power source 1 and the second power source 2, and electric current consumed for charging, in association with the timing of flow of light emitting current occurring when the LED 7 emits light, with the elapse of time.

First, the first power source 1 supplies electric power to the other load 11 including the microcomputer 12 other than the LED light emitting device, which means that a constant load (basic circuit load) is applied to the first power source 1. For this reason, a current that can be supplied from the first power source 1 to the LED light emitting device (i.e. output current) is equal to a current (allowable current value) 20 obtained by subtracting a current flowing through the basic circuit load from an allowance of current from the first power source 1 (allowance of output current from the first power source).

On the other hand, when causing the LED 7 to emit light using the second power source 2, the charging circuit 3 is required to charge the second power source 2 from the first power source 1 with a current not larger than the allowable current value 20. Then, when the voltage of the second power source becomes equal to or higher than a predetermined voltage, the power supply-switching section 5a turns on the SW circuit 10 and turns off the SW circuit 9 under the control of the microcomputer 12.

At this time, the microcomputer 12 turns on the drive signal (CTL signal) to cause the power supply controller 5 to drive the N-ch transistor Q1 and the P-ch transistor Q2, whereby the light emitting current is supplied from the second power source 2 to the LED 7 to cause the LED 7 to emit light.

In this case, the current peak value for the LED 7 and the light emission time period are required to be set in advance such that the voltage level of the second power source 2, which is lowered according to the current peak value and the light emission time period, is in a range within which the power supply controller 5 and the power supply generation section 6 can operate. When causing the LED 7 to emit light using the second power source 2, there is no restriction of the allowance of current, and hence it is possible to cause current with a relatively large peak value to flow through the LED 7 in a short time period.

The current peak value for the LED 7 is calculated in advance such that an output current from the first power source 1 becomes not larger than the above-mentioned allowable current value 20 when causing the LED 7 to emit light using the first power source 1. Then, it is necessary to cause the LED 7 to emit light at a current value not larger than the calculated current peak value. That is, when causing the LED 7 to emit light using the first power source 1, it is possible to continuously emit light from the LED 7 for a relatively long time period by causing the LED 7 to emit light at a current peak value not larger than the allowable current value 20.

Figure 3A:
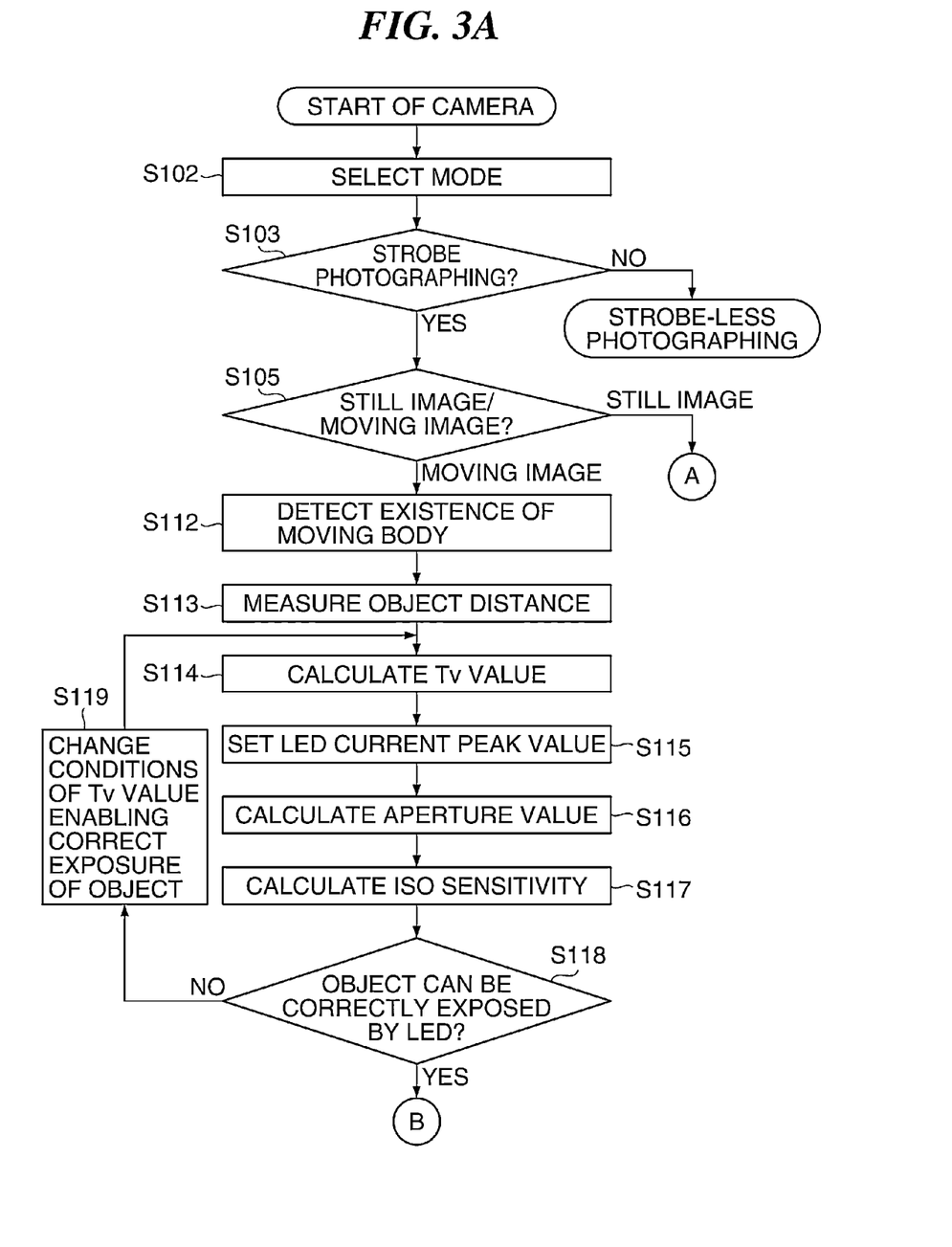
FIGS. 3A and 3B are a flowchart of a photographing process performed by the camera shown in FIG. 1.
Figure 3B:
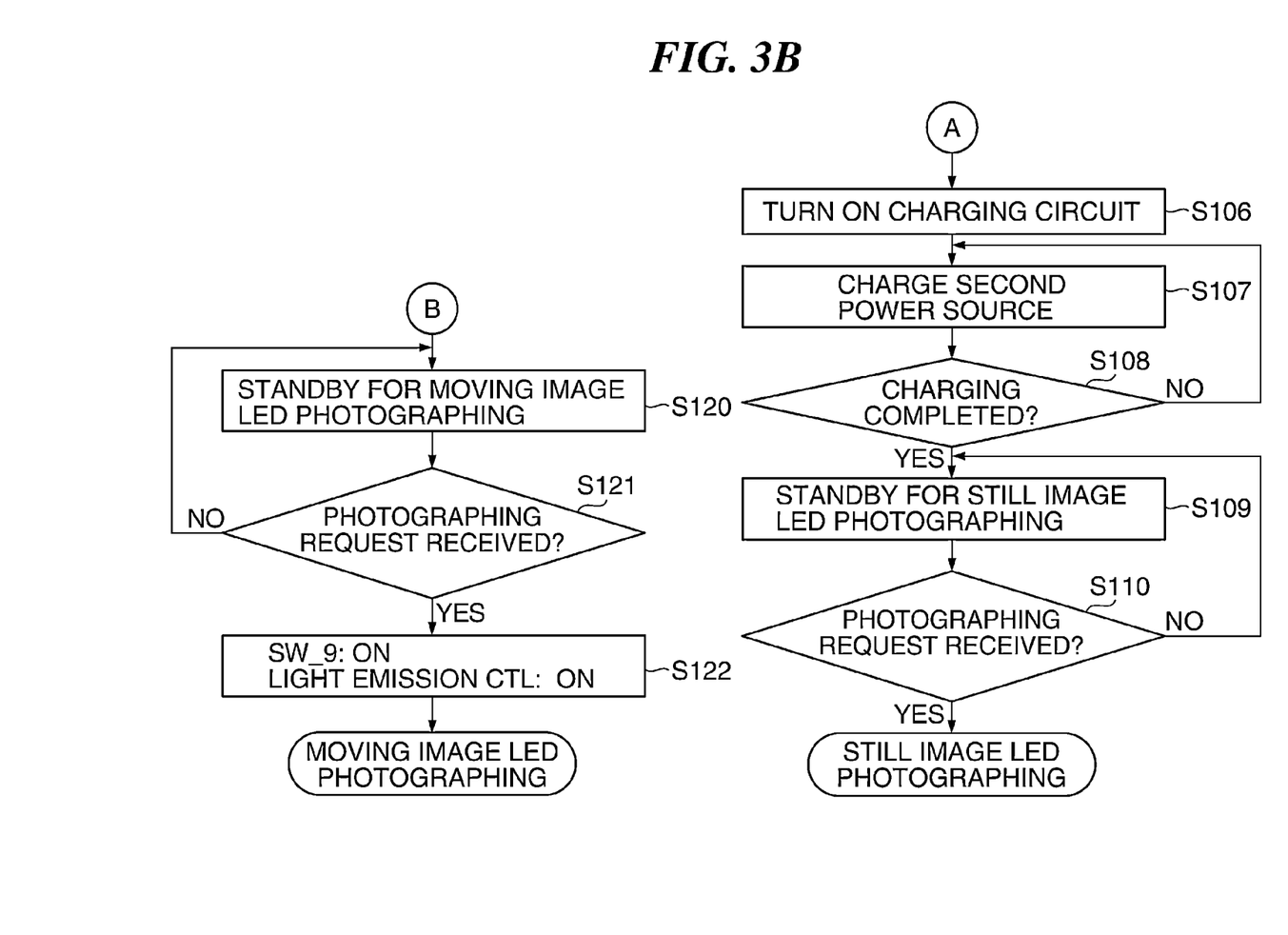

FIGS. 3A and 3B are a flowchart of a photographing process performed by the camera shown in FIG. 1. The photographing process in FIGS. 3A and 3B is performed under the control of the microcomputer 12 provided in the camera.

When the camera is started up, i.e. when the camera is powered on, the microcomputer 12 is started. Then, the user selects a photographing mode to which the camera is to be set, using the operation member 13 (step S102).

After the photographing mode is selected, the microcomputer 12 determines whether or not the selected photographing mode is a strobe photographing mode using the LED light emitting device (hereinafter simply referred to as the strobe) (step S103).

If the selected photographing mode is not the strobe photographing mode (NO to the step S103), the microcomputer 12 performs strobe-less photographing in which photographing is performed without using the strobe. On the other hand, if the selected photographing mode is the strobe photographing mode (YES to the step S103), the microcomputer 12 determines which of the still image photographing mode and the moving image photographing mode is selected by the user using the operation member 13 (step S105).

If it is determined that the still image photographing mode is selected ("still image" in the step S105), the microcomputer 12 turns on the charging circuit 3 (step S106). That is, the microcomputer 12 drives the charging circuit 3.

As a consequence, the charging circuit 3 charges the second power source (electric double-layer capacitor) 2 using the first power source 1 (step S107). Note that at this time, the power supply-switching section 5a causes the SW circuits 9 and 10 to be held off.

The microcomputer 12 determines whether or not the charging voltage of the second power source 2 has exceeded a predetermined voltage level (charging voltage level). That is, the microcomputer 12 determines whether or not the charging of the second power source 2 is completed (step S108). If the charging of the second power source 2 is not completed (NO to the step S108), the microcomputer 12 returns to the step S107, and continues the charging of the second power source 2.

If the charging of the second power source 2 is completed (YES to the step S108), the microcomputer 12 enters a standby state for still image strobe photographing (still image LED photographing) (step S109). In this standby state, the microcomputer 12 determines whether or not a photographing request has been received from the user having pressed a release button (not shown) provided on the operation member 13 (step S110).

If no photographing request has been received (NO to the step S110), the microcomputer 12 remains on standby. On the other hand, if a photographing request has been received (YES to the step S110), the microcomputer 12 causes the power supply-switching section 5a to turn on the SW circuit 10 to thereby select the second power source 2.

Further, the microcomputer 12 turns on the AND gate 5f which is a buffer circuit, and causes the driver section 5g to drive the N-ch transistor Q1 and the P-ch transistor Q2. As a consequence, the light emitting current flows from the second power source 2 through the LED 7, whereby still image LED photographing is performed.

On the other hand, if it is determined in the step S105 that the moving image photographing mode is selected ("moving image" in the step S105), the microcomputer 12 causes an image controller (not shown) provided in the camera to detect whether or not a main object is a moving body in an image obtained by an image pickup section (not shown) (step S112). Next, the microcomputer 12 measures a distance to the main object in the image (step S113).

Then, the microcomputer 12 calculates a Tv value (shutter speed, i.e. accumulation time) used in the image pickup section based on an amount of motion of the main object (step S114). Then, the microcomputer 12 calculates the current peak value of light emitting current based on the above-mentioned allowable current value 20 (step S115).

The microcomputer 12 calculates an aperture value (Av value) according to a predetermined program diagram using the calculated Tv value and current peak value (step S116). Further, the microcomputer 12 calculates an ISO sensitivity according to the calculated Tv value and current peak value (step S117). Then, the microcomputer 12 determines whether or not the main object can be correctly exposed by the LED (an image can be obtained in which the main object has a target brightness) based on the calculated Tv value, current peak value, aperture value, and ISO sensitivity (step S118).

If it is determined that the main object cannot be correctly exposed (NO to the step S118), i.e. if the main object is to be under-exposed, the microcomputer 12 changes the calculating conditions of the Tv value to those which make it possible to cause the main object to be correctly exposed (step S119), and returns to the step S114, wherein the microcomputer 12 calculates the Tv value such that it causes the main object to be correctly exposed, again.

If it is determined that the main object can be correctly exposed (YES to the step S118), the microcomputer 12 enters a standby state for moving image strobe photographing (moving image LED photographing) (step S120). Then, the microcomputer 12 determines whether or not a photographing request has been received from the user (step S121).

If no photographing request has been received (NO to the step S121), the microcomputer 12 remains on standby. On the other hand, if a photographing request has been received (YES to the step S121), the microcomputer 12 causes the power supply-switching section 5a to turn on the SW circuit 9 to select the first power source 1.

Further, the microcomputer 12 outputs the CTL signal (drive signal) to thereby turn on the AND gate 5f to thereby cause the driver section 5g to drive the N-ch transistor Q1 and the P-ch transistor Q2 (step S122). As a consequence, the light emitting current flows from the first power source 1 through the LED 7, whereby moving image LED photographing is performed.

As described above, in the first embodiment, when performing still image photographing in which the current peak value of the light emitting current for causing the LED 7 to emit light is high and the light emission time period is short, the second power source 2 is used which is low in internal impedance.

By using the second power source 2, light emission is controlled such that the LED emits a large amount of light per one emission while reducing an instantaneous voltage drop of the power source.

On the other hand, when performing moving image photographing in which the current peak value of the light emitting current for causing the LED 7 to emit light is low and the light emission time period is long, light emission control is performed using the first power source 1 which can continuously supply the light emitting current, with an output current not larger than the allowable current value 20 of the first power source 1.

This enables the user to continuously perform strobe photographing at a desired timing when photographing a moving image. That is, it is possible to perform the strobe photographing mode in such a manner that the release timing is given priority.

Further, after waiting for a predetermined time period until the second power source 2 is charged while photographing a moving image, the user can perform strobe photographing of a still image with an increased amount of light emission.

Next, a description will be given of an image pickup apparatus according to a second embodiment of the present invention.

Figure 4:
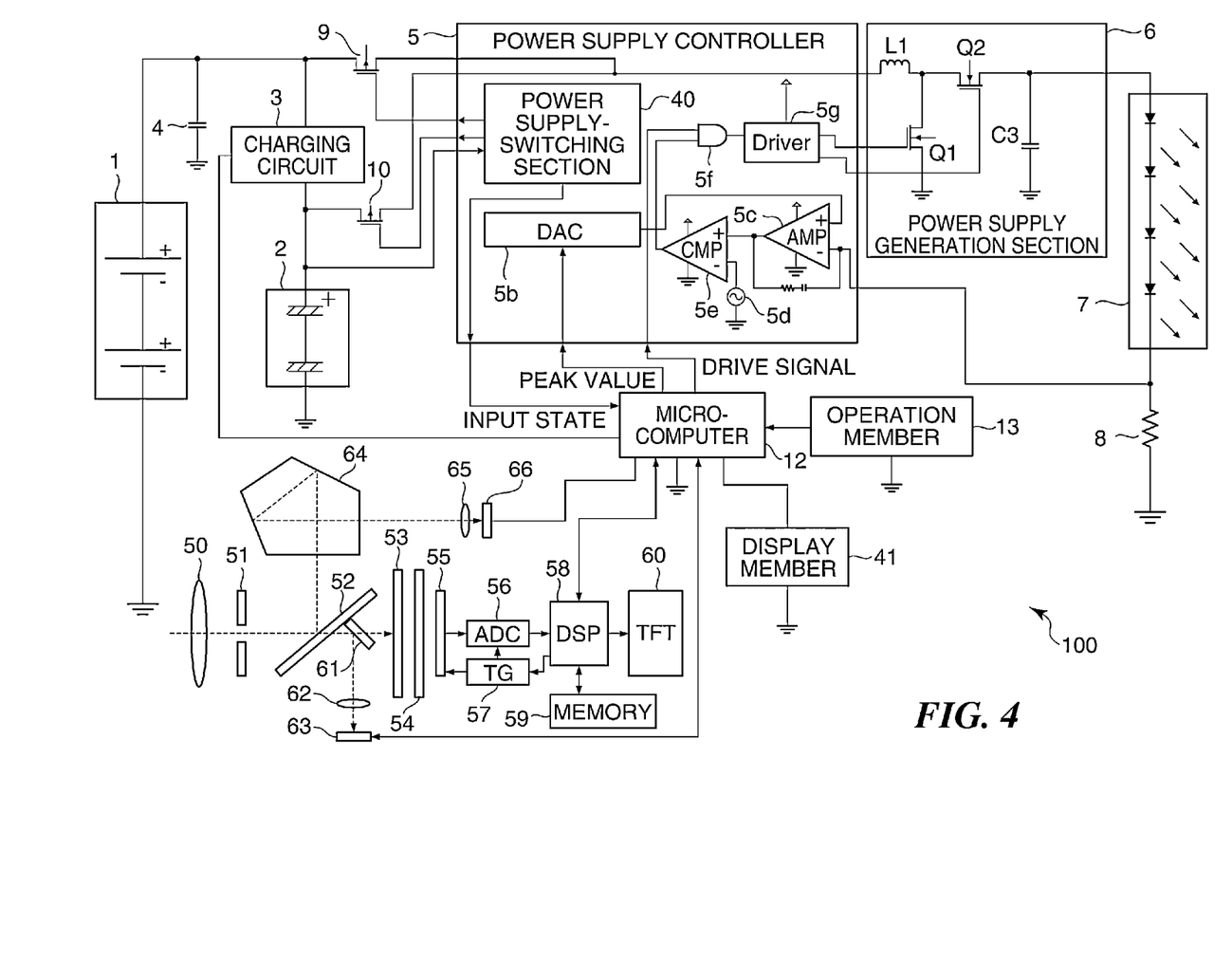
FIG. 4 is a circuit diagram of part of a single-lens reflex camera as an image pickup apparatus according to a second embodiment of the present invention.

FIG. 4 is a circuit diagram of part of a single-lens reflex camera as the image pickup apparatus according to the second embodiment.

The image pickup apparatus according to the second embodiment is e.g. a digital single-lens reflex camera (hereinafter simply referred to as the "single-lens reflex camera"), and includes the same LED light emitting device 100 as the LED light emitting device (strobe) described with reference to FIG. 1.

Note that the LED light emitting device 100 shown in FIG. 4 differs from the LED light emitting device 100 shown in FIG. 1 in the function of the power supply-switching section, and hence in the present embodiment, the power supply-switching section is denoted by reference numeral 40.

Further, in FIG. 4, the other load 11 is omitted. That is, although actually, power is supplied from the first power source 1 to the microcomputer 12 and the modules including a digital signal processor (DSP) 58 and so forth, wiring for supplying power to each module is omitted in FIG. 4.

A plus side terminal of the second power source 2 is connected to the power supply-switching section 40 as an input, and the power supply-switching section 40 performs on-off control of the SW circuits 9 and 10 according to the voltage level of the plus side terminal. Further, the power supply-switching section 40 sends the voltage level of the plus side terminal of the second power source 2 (i.e. charging voltage level) to the microcomputer 12.

In the present embodiment, the user makes a setting of the photographing mode for moving image photographing or still image photographing, and settings of the Tv value, the Av value, and the ISO sensitivity, using the operation member 13. Further, the user can perform a photographing preparation operation and a photographing starting operation by using the release button provided on the operation member 13.

A display member 41 displays the setting state of the photographing mode of the single-lens reflex camera, and parameters associated with photographing, such as the Tv value, the Av value, the ISO sensitivity, and white balance. The display member 41 further displays a plurality of charging completion states, referred to hereinafter.

The single-lens reflex camera includes a photographic lens 50 and a diaphragm 51, and a reflecting mirror 52 is disposed downstream of the diaphragm 51 at an angle of 45 degrees with respect to an optical axis. Before photographing, the reflecting mirror 52 is driven to be retracted into a position retreated from the optical axis.

The single-lens reflex camera includes an AF sensor 63 for auto focusing. A sub mirror 61 sends an optical image incident through the photographic lens 50 to a spectacle lens 62. Then, the spectacle lens 62 causes the optical image to be formed on the AF sensor 63.

A front curtain 53 and a rear curtain 54 of a focal-plane shutter are disposed behind the reflecting mirror 52, and an image pickup device 55 is disposed downstream of the front curtain 53 and the rear curtain 54.

The image pickup device 55 appearing in FIG. 4 is implemented by a CMOS image sensor, for example. The optical image is formed on the image pickup device 55 via the photographic lens 50, the diaphragm 51, and the front curtain 53 and the rear curtain 54 of the focal plane shutter.

On the other hand, the optical image is reflected by the reflecting mirror 52, and is sent to a photometric lens 65 via a pentaprism 64. The photometric lens 65 causes the optical image to be formed on a photometric sensor 66.

The image pickup device 55 outputs an analog image signal corresponding to the optical image. The analog image signal is converted to a digital image signal by an analog-to-digital converter (ADC) 56. Then, the digital image signal is sent to the DSP 58. The DSP 58 performs predetermined image processing on the digital image signal to thereby generate image data, and records the generated image data in a memory 59.

A timing generator (TG) 57 is controlled by the DSP 58. The DSP 58 controls the image pickup device 55 and the ADC 56 in a synchronizing manner using a timing signal output from the timing generator 57. The image data output from the DSP 58 is sent to an external liquid crystal device (TFT: thin-film transistor display) 60, and the TFT 60 displays an image corresponding to the image data.

Figure 5:
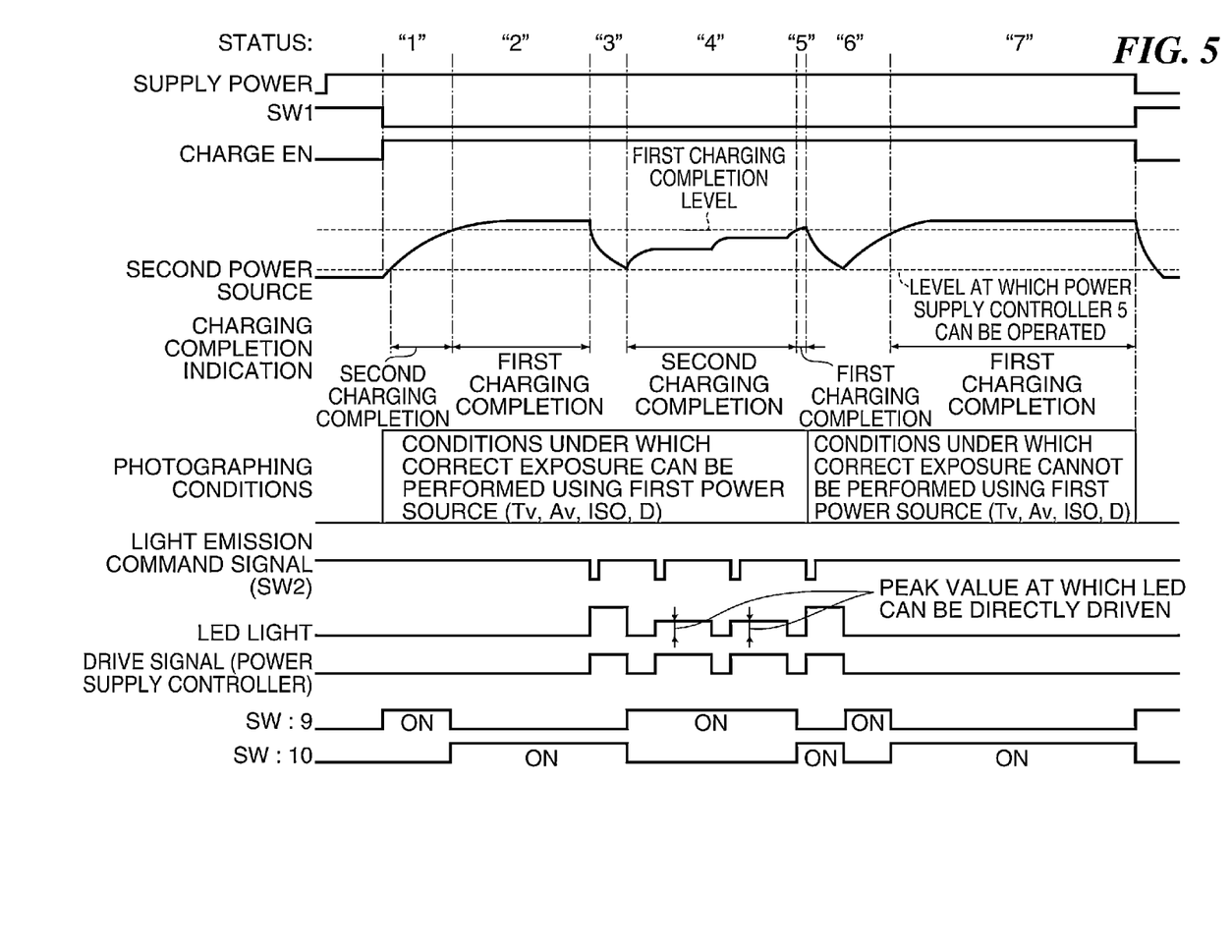
FIG. 5 is a timing diagram useful in explaining the operation of the single-lens reflex camera shown in FIG. 4.

FIG. 5 is a timing diagram useful in explaining the operation of the single-lens reflex camera shown in FIG. 4.

In a status "1", after the single-lens reflex camera is powered on, when a user half-presses the release button provided on the operation member 13 (SW1: Low), the microcomputer 12 starts the photographing preparation operation.

In the photographing preparation operation, the microcomputer 12 outputs a charge enable (charge EN) signal to the charging circuit 3 (sets charge EN to a high level). As a consequence, the charge circuit 3 charges the second power source 2 using current from the first power source 1.

At this time, the power supply-switching section 40 turns on the SW circuit 9 under the control of the microcomputer 12. The status "1" of the microcomputer 12, shown in FIG. 5, corresponds to a state of the LED light emitting device, in which the object can be correctly exposed using current which is not larger than the allowable current value 20 and dependent on the current peak value of the LED 7 under the conditions of the Tv value, the Av value, the ISO sensitivity, and a distance over which the strobe light travels to reach the object, as described hereinafter. In this status "1", the charging voltage of the second power source 2 is at a second charging completion level, and the microcomputer 12 displays a second charging completion indication indicative of a state of second charging completion on the display member 41.

Then, when the charging voltage of the second power source 2 exceeds a predetermined charging voltage level (first charging completion level), the power supply-switching section 40 turns off the SW circuit 9, and turns on the SW circuit 10.

As a consequence, the microcomputer 12 enters a status "2" in which the charging voltage of the second power source 2 has reached the first charging completion level, and displays a first charging completion indication indicative of a state of first charging completion on the display member 41.

Note that the first charging completion level is a level at which after full light emission for still image photographing, voltage remaining in the second power source 2 is capable of causing the LED 7 to emit light.

Next, in the status "2" of the microcomputer 12 corresponding to the first charging completion level of the charging voltage of the second power source, when a photographing request (light emission command signal) is received from the user, i.e. when the user fully presses the release button (SW2: Low), the microcomputer 12 enters a status "3" in which the drive signal is turned on.

As a consequence, using the second power source 2 as the power supply input, the power supply controller 5 drives the power supply generation section 6 with current at the current peak value set by the microcomputer 12 in advance, to thereby cause the LED 7 to emit light.

Subsequently, after the drive signal sent from the microcomputer 12 to the power supply controller 5 is switched from on to off, the power supply-switching section 40 turns off the SW circuit 10, and turns on the SW circuit 9. As a consequence, the microcomputer 12 enters a status "4".

The status "4" corresponds to the aforementioned state of the LED light emitting device, in which the object can be correctly exposed using current which is not larger than the allowable current value 20 and dependent on the current peak value of the LED 7 so as to emit light under the conditions of the Tv value, the Av value, the ISO sensitivity, and the distance over which the strobe light travels to reach the object. That is, in the status "4", similarly to the status "1", the charging voltage of the second power source 2 is at the second charging completion level, and the microcomputer 12 displays a second charging completion indication indicative of the state of second charging completion on the display member 41.

If a photographing request is received from the user in the status "4", the microcomputer 12 turns on the drive signal sent to the power supply controller 5. As a consequence, the power supply controller 5 drives the power supply generation section 6 using the first power source 1 as the input power supply, whereby the LED 7 is driven by current which is not larger than the allowable current value 20 and dependent on the current peak value of the LED 7 to emit light.

The illustrated example shows a case where photographing requests are sequentially received from the user in the status "4", and the microcomputer 12 turns on the drive signal sent to the power supply controller 5 to thereby cause the LED 7 to be driven to emit light in the above-described manner.

When the charging voltage level of the second power source 2 exceeds the aforementioned predetermined charging voltage level (charging completion level) to reach the first charging completion level again, the microcomputer 12 enters a status "5". In the illustrated example, there is shown a case where according to turn-on of the drive signal, the LED 7 is driven using current from the second power source 2 to cause the same to emit light, but thereafter, the conditions of the Tv value, the Av value, the ISO sensitivity, and the distance over which the strobe light travels to reach the object do not allow the object to be correctly exposed by using current from the first power source 1 at the output current not larger than the allowable current value 20 and dependent on the current peak value of the LED 7.

Therefore, the microcomputer 12 does not enter a status of charging completion until the charging voltage level of the second power source 2 exceeds the predetermined charging voltage level (status "6"). When the charging voltage level of the second power source 2 exceeds the predetermined charging voltage level to reach the first charging completion level, the microcomputer 12 enters a status "7", and displays the first charging completion indication on the display member 41.

Figure 6A:
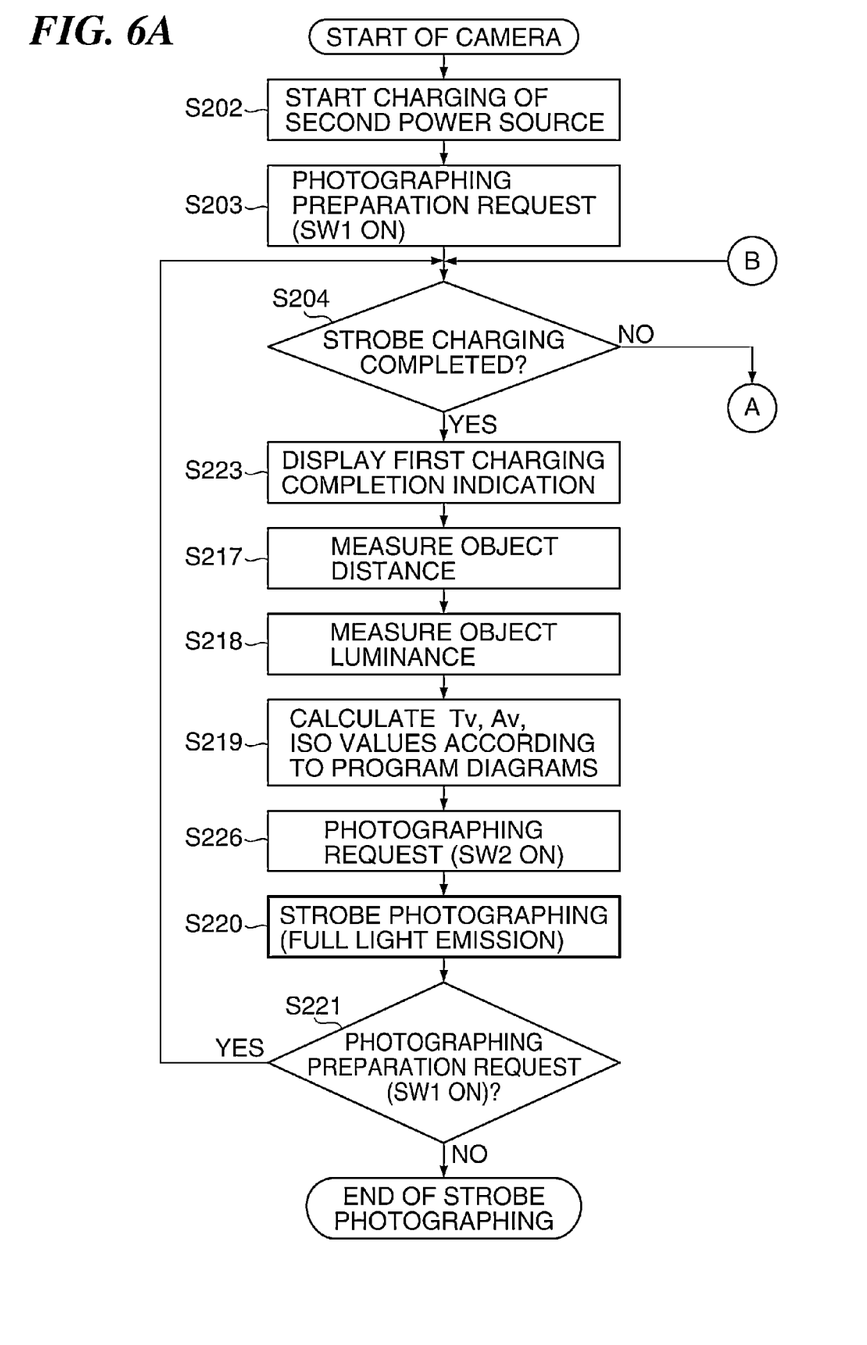
FIGS. 6A and 6B are a flowchart of a photographing process performed by the single-lens reflex camera shown in FIG. 4.
Figure 6B:
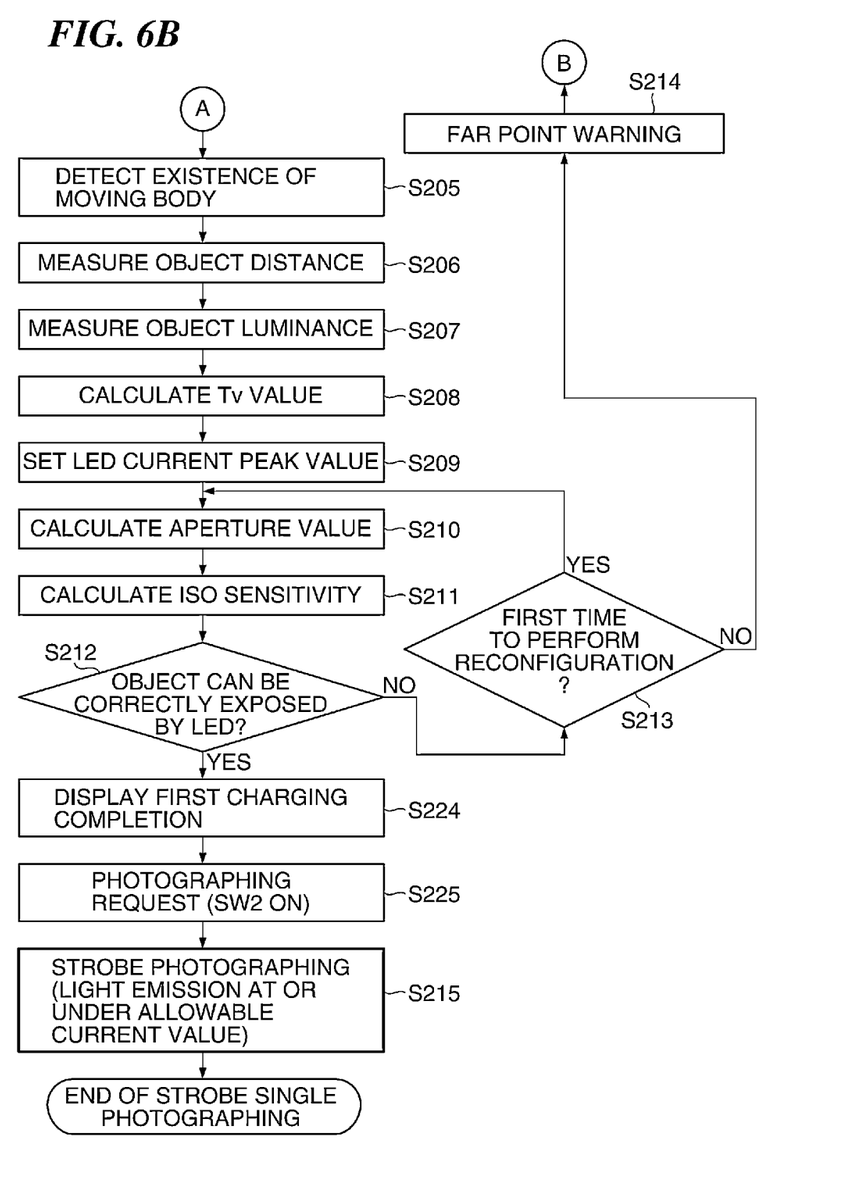

FIGS. 6A and 6B are a flowchart of a photographing process performed by the single-lens reflex camera shown in FIG. 4. The photographing process in FIGS. 6A and 6B is performed under the control of the microcomputer 12.

When the single-lens reflex camera is started up, i.e. when the single-lens reflex camera is powered on, the microcomputer 12 is started. The microcomputer 12 controls the charging circuit 3 such that the second power source 2 is charged using current from the first power source 1 (step S202).

When the user half-presses the release button provided on the operation member 14 (SW1 ON), i.e. when a photographing preparation request is received from the user (step S203), the microcomputer 12 determines whether or not the charging voltage level of the second power source 2 has reached the first charging completion level. That is, the microcomputer 12 determines whether or not the charging voltage level of the second power source 2 has exceeded the predetermined charging voltage level to complete strobe charging (step S204).

Note that the first charging completion level is a level of voltage remaining in the second power source 2 at which the LED 7 can be operated to emit light after full light emission for still image photographing, as mentioned hereinbefore.

If the charging voltage level of the second power source 2 is not higher than the predetermined charging voltage level, i.e. if strobe charging is not completed (NO to the step S204), the microcomputer 12 enters a first light emission control mode, and accordingly, the microcomputer 12 determines based on an output from the AF sensor 63 whether or not the object is a moving body (step S205).

Next, the microcomputer 12 measures a distance to the object (object distance) according to an output from the AF sensor 63 (step S206).

Further, the microcomputer 12 measures a luminance of the object (object luminance) based on an output from the photometric sensor 66 (step S207). Then, the microcomputer 12 calculates, based on the measured object distance (D) and object luminance, a Tv value at such a level that blurring of the object does not occur (step S208).

Then, the microcomputer 12 calculates a current peak value of the LED 7 to be caused by electric power which can be supplied from the first power source 1, and sets the calculated current peak value in the power supply controller 5 (step S209). Then, the microcomputer 12 calculates an aperture value (Av value) according to a predetermined program diagram using the calculated Tv value and current peak value (step S210).

Next, the microcomputer 12 calculates the ISO sensitivity at which the object can be correctly exposed, according to the object distance (D), the object luminance, the Tv value, the current peak value, and the aperture value, determined in the steps S206 to S210 (step S211). Then, the microcomputer 12 checks whether or not the object can be correctly exposed assuming that LED light emission is performed under the photographing conditions determined in the steps S206 to S211 (step S212).

If the object cannot be correctly exposed (NO to the step S212), the microcomputer 12 performs reconfiguration of the settings. In doing this, the microcomputer 12 determines whether or not it is the first time to perform the reconfiguration (step S213). If it is the first time to perform the reconfiguration (YES to the step S213), the microcomputer 12 returns to the step S210.

On the other hand, if it is the second time to perform the reconfiguration (NO to the step S213), the microcomputer 12 displays a far point warning indicating that the strobe light does not reach the object, on the display member 41 (step S214). Then, the microcomputer 12 returns to the step S204.

If the object can be correctly exposed (YES to the step S212), the microcomputer 12 displays the second charging completion indication on the display member 41 (step S224). Then, when the user fully presses the release button provided on the operation member 13 (SW2 is turned on), i.e. when a photographing request is received from the user (step S225), the microcomputer 12 turns on the drive signal sent to the power supply controller 5 to thereby perform strobe photographing in which the LED 7 is caused to emit light, using current which is not larger than the allowable current value 20 and dependent on the current peak value of the LED 7 to emit light (step S215). Then, the microcomputer 12 terminates strobe single photographing.

If the object can be correctly exposed in the first light emission control mode, light emission is performed using the first power source 1, which makes it possible to continuously perform strobe photographing.

If the charging voltage level of the second power source 2 has exceeded the predetermined charging voltage level to reach the first charging completion level, i.e. if strobe charging is completed (YES to the step S204), the microcomputer 12 displays the first charging completion indication on the display member 41 (step S223), and enters a second light emission control mode. In the second light emission control mode, the microcomputer 12 measures a distance to the object (object distance) based on an output from the AF sensor 63 (step S217).

Further, the microcomputer 12 measures a luminance of the object (object luminance) based on an output from the photometric sensor 66 (step S218). Then, the microcomputer 12 calculates the Tv value, the Av value, and the ISO sensitivity according to program diagrams set in advance for strobe photographing (step S219).

Then, when the user fully presses the release button provided on the operation member 13 (SW2 is on), i.e. when a photographing request is received from the user (step S226), the microcomputer 12 turns on the drive signal sent to the power supply controller 5 to thereby perform strobe photographing in which the LED 7 is caused to perform full light emission (step S220).

Next, the microcomputer 12 determines whether or not a photographing preparation request has been received (SW1 has been turned on) (step S221). If no photographing preparation request has been received (NO to the step S221), the microcomputer 12 terminates strobe photographing.

On the other hand, if a photographing preparation request has been received (NO to the step S221), the microcomputer 12 returns to the step S204.

In this second light emission control mode, it is possible to perform strobe photographing by full light emission using the second power source 2.

As described above, in the second embodiment, the user is selectively notified of the state of first charging completion in which full light emission can be performed but continuous light emission is difficult to perform, and the state of second charging completion in which the amount of light emission is limited but continuous light emission can be performed. Then, if a photographing request is received in one of these states of charging completion, strobe photographing is performed according to the state of charging completion at the time of reception of the photographing request.

This enables the user to perform strobe photographing without concern for the charging recycle period.

As is clear from the above description, in the illustrated example in FIG. 1, the microcomputer 12 and the power supply controller 5 function as a light emission control unit, and the microcomputer 12 functions as a display control unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-025516 filed Feb. 13, 2014, which is hereby incorporated by reference herein in its entirety.

What is claimed is:

1. A light emitting device that includes a light emitting section for emitting light, and illuminates an object by the light emitting section, comprising:
   a first power source;
   a second power source configured to be charged by said first power source; and
   a light emission control unit configured to perform light emission control of the light emitting section,
   wherein the light emission control unit is configured to switch between using said first power source and said second power source as an input power supply for the light emission based on a light emitting current for causing the light emitting section to emit light.

2. The light emitting device according to claim 1, wherein said light emission control unit selects said first power source as the input power supply, in a case where said first power source can supply current at a peak value of the light emitting current.

3. A light emitting device that includes a light emitting section for emitting light, and illuminates an object by the light emitting section, comprising:
   a first power source;
   a second power source configured to be charged by said first power source; and
   a light emission control unit configured to perform light emission control of the light emitting section,
   wherein the light emission control unit is configured to switch between using said first power source and said second power source as an input power supply for the light emission based on a charging voltage level of said second power source.

4. The light emitting device according to claim 3, wherein said light emission control unit performs, in a case where the charging voltage level of said second power source is not higher than a predetermined charging voltage level at a timing at which the light emitting section is to be caused to emit light, first light emission control for causing the light emitting section to emit light using said first power source as the input power supply, and in a case where the charging voltage level of said second power source exceeds the predetermined charging voltage level, second light emission control for causing the light emitting section to emit light using said second power source as the input power supply.

5. The light emitting device according to claim 4, wherein in the first light emission control, light emission control of the light emitting section is performed according to a peak value of the light emitting current which is not larger than an allowance of output current from said first power source, and in the second light emission control, light emission control of the light emitting section is performed at a charging voltage level of said second power source which exceeds the predetermined charging voltage level and is capable of causing the light emitting section to perform full light emission.

6. The light emitting device according to claim 4, further comprising a display control unit configured to display a first charging completion indication indicative of completion of charging, on a display section, when the charging voltage level of said second power source exceeds the predetermined charging voltage level.

7. The light emitting device according to claim 6, wherein in a case where an object can be correctly exposed at a peak value of the light emitting current which is not larger than an allowance of output current from said first power source, said display control unit displays a second charging completion indication on the display section.

8. The light emitting device according to claim 1, wherein said second power source is lower in internal impedance than said first power source.

9. The light emitting device according to claim 8, wherein said first power source is a battery, and said second power source is a capacitor.

10. The light emitting device according to claim 1, wherein an LED is used as the light emitting section.

11. An image pickup apparatus comprising:
an image pickup unit configured to obtain an image by picking up an image of an object;
a light emitting device that includes a light emitting section for emitting light, and illuminates an object by the light emitting section, said light emitting device including:
a first power source,
a second power source configured to be charged by said first power source, and
a light emission control unit configured to perform light emission control of said light emitting section, wherein the light emission control unit is configured to switch between using said first power source and said second power source as an input power supply for the light emission based on a light emitting current for causing said light emitting section to emit light; and
an image processing unit configured to perform predetermined image processing on the image obtained by said image pickup unit to thereby obtain image data.

12. An image pickup apparatus comprising:
an image pickup unit configured to obtain an image by picking up an image of an object;
a light emitting device that includes a light emitting section for emitting light, and illuminates an object by said light emitting section, said light emitting device including:
a first power source,
a second power source configured to be charged by said first power source, and
a light emission control unit configured to perform light emission control of said light emitting section, wherein the light emission control unit is configured to switch between using said first power source and said second power source as an input power supply for the light emission based on a charging voltage level of said second power source; and
an image processing unit configured to perform predetermined image processing on the image obtained by said image pickup unit to thereby obtain image data.

13. The image pickup apparatus according to claim 12, further comprising a display control unit configured to display a first charging completion indication indicative of completion of charging, on a display section, when the charging voltage level of said second power source exceeds the predetermined charging voltage level, and
wherein in a case where an object can be correctly exposed at a peak value of the light emitting current which is not larger than an allowance of output current from said first power source, said display control unit displays a second charging completion indication on the display section.

14. The image pickup apparatus according to claim 13, wherein in a case where an object can be correctly exposed under conditions of a shutter speed, an aperture value, an ISO sensitivity, and an object distance indicative of a distance to the object, for picking up an image of the object, said display control unit displays the second charging completion indication on the display section.

15. A method of controlling a light emitting device that includes a light emitting section for emitting light, a first power source, and a second power source configured to be charged by the first power source, and illuminates an object by the light emitting section, comprising:
determining light emitting current for causing the light emitting section to emit light;
performing light emission control of the light emitting section; and
switching between using the first power source and the second power source as an input power supply for the light emission based on the determined light emitting current.

16. A method of controlling a light emitting device that includes a light emitting section for emitting light, a first power source, and a second power source configured to be charged by the first power source, and illuminates an object by the light emitting section, comprising:
detecting a charging voltage level of the second power source;
performing light emission control of the light emitting section; and
switching between using the first power source and the second power source as an input power supply for the light emission based on the detected charging voltage level of the second power source.

17. A non-transitory computer-readable storage medium storing a computer-executable control program for causing a computer to execute a method of controlling a light emitting device that includes a light emitting section for emitting light, a first power source, and a second power source configured to be charged by the first power source, and illuminates an object by the light emitting section,
  wherein the method comprises:
    determining light emitting current for causing the light emitting section to emit light;
    performing light emission control of the light emitting section; and
    switching between using the first power source and the second power source as an input power supply for the light emission based on the determined light emitting current.

18. A non-transitory computer-readable storage medium storing a computer-executable control program for causing a computer to execute a method of controlling a light emitting device that includes a light emitting section for emitting light, a first power source, and a second power source configured to be charged by the first power source, and illuminates an object by the light emitting section,
  wherein the method comprises:
    detecting a charging voltage level of the second power source;
    performing light emission control of the light emitting section; and
    switching between using the first power source and the second power source as an input power supply for the light emission based on the detected charging voltage level of the second power source.

* * * * *